United States Patent [19]
Ehs

[11] Patent Number: 4,778,073
[45] Date of Patent: Oct. 18, 1988

[54] PRESSURE VESSEL

[76] Inventor: Eugen Ehs, Agnesstr. 46, 8000 München, Fed. Rep. of Germany, 40

[21] Appl. No.: 66,189

[22] Filed: Jun. 25, 1987

[30] Foreign Application Priority Data

Sep. 19, 1986 [DE] Fed. Rep. of Germany ....... 3631975
May 21, 1987 [EP] European Pat. Off. ........ 87107424.1

[51] Int. Cl.$^4$ .......................................... B65D 1/16
[52] U.S. Cl. .................................. 220/3; 220/455; 220/465; 220/470; 220/83; 220/414
[58] Field of Search ............... 220/3, 453, 455, 465, 220/83, 414, 470

[56] References Cited

U.S. PATENT DOCUMENTS

| | | | |
|---|---|---|---|
| 3,210,228 | 10/1965 | Bluck | 220/414 X |
| 3,969,812 | 7/1976 | Beck | 220/414 X |
| 4,602,480 | 7/1986 | Hill et al. | 220/414 X |
| 4,614,279 | 9/1986 | Toth et al. | 220/414 X |
| 4,699,288 | 10/1987 | Mohan | 220/414 X |
| 4,714,094 | 12/1987 | Tovagliaro | 220/414 X |

Primary Examiner—Steven M. Pollard
Attorney, Agent, or Firm—James E. Nilles

[57] ABSTRACT

The invention relates to a pressure vessel, particularly to a drier vessel for a vehicle air conditioning installation, and a method for making it. In the production of known pressure vessels, a hollow core body optionally provided with auxiliary winding bodies is provided with an outer winding layer of fibre-reinforced plastic acting to improve the resistance of the vessel to internal pressure. The production of such pressure vessels is rather expensive, because the core body and auxiliary winding bodies have to be separately prepared and formed to the desired shape of the finished pressure vessel. A relatively inexpensive and low-weight pressure vessel particularly suitable for use as a driver vessel in a vehicle air conditioning installation is provided according to the invention by the employ as said core body of a cylindrical standard blank from the mass-production of spray dispensers or beverage containers having at least one open end which is deformed as by press-forming, roll-forming or chasing to the shape of the top portion of the vessel. To further reduce the production costs of the pressure vessel the invention provides that the upper and lower ends of the core body are provided with respective coupling elements by means of which a plurality of core bodies may be interconnected in coaxial alignment to thereby form a winding unit to which the winding layer may be applied in a single operation. The auxiliary winding body is likewise formed of a standard blank from the mass-production of spray dispensers or beverage containers. Standard blanks of the type referred to are commercially available at low cost and in different sizes.

16 Claims, 3 Drawing Sheets

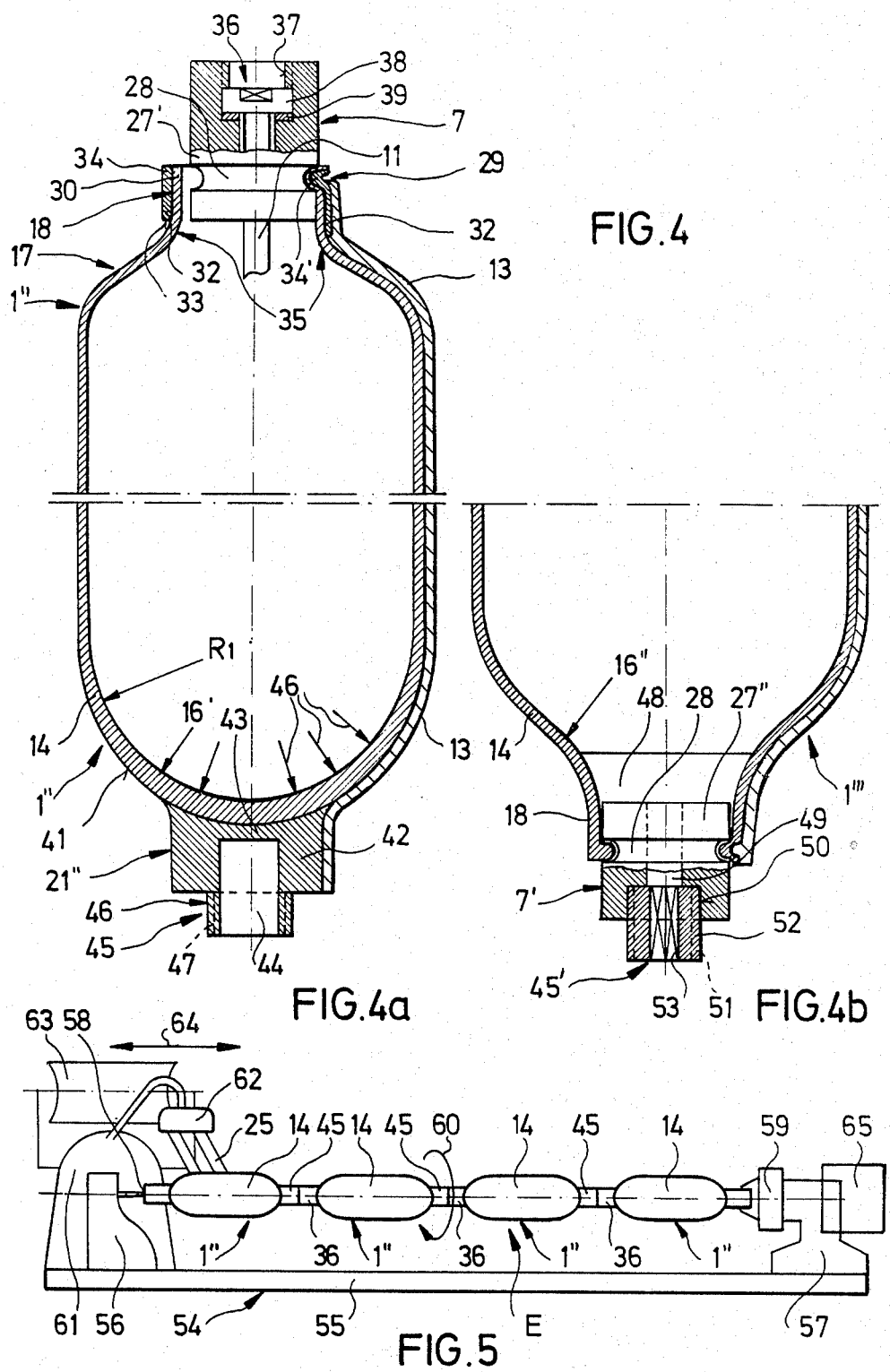

PRESSURE VESSEL

BACKGROUND OF THE INVENTION

DESCRIPTION

In a pressure vessel known from DE-OS No. 30 07 524 the outer surface of a blow-moulded plastic inner vessel determines the outer shape of the finished pressure vessel. The inner vessel has an open spigot extension and a cambered bottom. Applied to both ends of the inner vessel are strengthening caps, one of which has a collar surrounding the spigot extension of the inner vessel, while the other one has an outwards projecting pin. The strengthening caps act as auxiliary winding bodies formed with a recessed collar or shoulder, respectively, whereat the winding pitch is reversed as an outer winding layer is helically wound onto the inner vessel. In manufacturing a pressure vessel of this type, a single inner vessel with its strengthening caps is mounted in a winding apparatus to have the outer winding layer applied thereto, i.e. the pressure vessels are individually finished one after another. A disadvantage of this method is the expense for making the inner vessel which in the finished pressure vessel substantially acts as a lost core, but has nevertheless to be accurately shaped to determine the shape and desired volume of the finished pressure vessel. The costs for making the inner vessel and its strengthening caps contribute considerably to the overall all costs for the finished pressure vessel.

In a method for making a pressure vessel as known from DE-OS No. 28 07 966, an inner plastic vessel is likewise formed in a blow-moulding process and has strengthening caps applied to its ends before having a winding layer of glass fibre reinforced plastic wound thereon. Also in this case considerable costs are incurred for making the inner vessel, so that the costs for the inner vessel constitute a disproportional factor of the overall cost of the finished pressure vessel.

Described in a publicity leaflet issued in 1984 by the firm of Singer Controls Division, 9655 Soreng Ave, Ill., USA, under the title "Mobile Air Conditioning Service Bulletin" is a metal pressure vessel for use as a drier vessel in vehicle air conditioning installations. This pressure vessel is made of draw-moulded steel sheet upper and lower container halves joined to one another by welding. The most important disadvantage of this pressure vessel is its relatively heavy weight which is considered particularly disadvantageous in a vehicle air conditioning installation.

SUMMARY OF THE INVENTION

It is an object of the present invention to provide a pressure vessel of the type defined in the introduction, which is suitable for use as a drier vessel in a vehicle air conditioning installation and less expensive than known vessels for this purpose, and to propose a method for making such pressure vessels at reduced expense.

This object may be attained by the provision that the core body is a cylindrical cup-shaped standard blank as used in the mass production of spray dispensers or beverage containers and having its open end deformed, as by press-forming, roller-forming or chasing, to the shape of the vessel top portion including the open spigot extension, or alternatively by the provision that the core body has both of its ends provided with coupling elements disposed coaxially with the longitudinal axis of the pressure vessel, and by means of which at least two core bodies may be interconnected—bottom end to bottom end or bottom end to top end—in coaxial alignment to thereby form a winding unit.

These alternatives, which may also be used in combination, permit pressure vessels of this type to be made in a very cost-effective manner. Standard blanks from the mass production of spray dispensers or beverage containers are manufactured in vast numbers and are therefore commercially available at extremely low cost. They are also capable of being readily deformed by means of simple tools to thereby establish the desired shape of the pressure vessel at least in its top portion, as the cylindrical portion of such blanks has a wall thickness of only a few tenths of a millimeter. On the other hand the standard blanks are sufficiently rigid to withstand the forces inevitably acting thereon as the winding layer is being applied. The costs for the standard blank and its preparation are thus rather insignificant with regard to the overall costs for a pressure vessel made in this manner. When the pressure vessel is to be used as the drier vessel in a vehicle air conditioning installation, the advantages obtained thereby are not only due to the reduced production costs, but also the reduction of its weight by up to about 50% as compared to that of the conventional metal pressure vessel. The employ of the coupling elements provided on the core body permits the costs for applying the winding layer to be considerably reduced, because the coupling elements may be used for coaxially interconnecting a plurality of such core bodies to thereby form a winding unit to which the winding layer may be applied in a single operation, so that the conventional practice of winding the pressure vessels individually can be abandoned. Optimum results may be achieved by employing standard blanks from the mass production of spray dispensers or beverage containers, in combination with coaxially interconnecting the core bodies formed thereof by means of coupling elements to thereby permit the winding layer to be applied to a plurality of core bodies in a single operation.

Particular advantages are offered by an embodiment in which the spigot extension of the corebody is provided with a strengthening sleeve, whereby the resistance to pressure in this critical portion of the finished pressure vessel is noticeably improved.

Embodiments of the invention shall now be described by way of example with reference to the accompanying drawings, wherein:

BRIEF DESCRIPTION OF DRAWINGS

FIG. 4 shows a sectional view ofthe top portion of still another embodiment of the pressure vessel in an intermediate stage (left) and the final stage (right) of its production, FIG. 4a shows a sectional view of the bottom portion of the respective pressure vessel, in an intermediate stage (left) and the final stage (right) of its production, FIG. 4b shows a sectional view of another embodiment of the bottom portion of the pressure vessel in an intermediate stage (left) and the final stage (right) of its production, and FIG. 5 shows a diagrammatical illustration of a machine for making a plurality of pressure vessels.

DESCRIPTION OF PREFERRED EMBODIMENT

Figures 1, 2A, 2B:
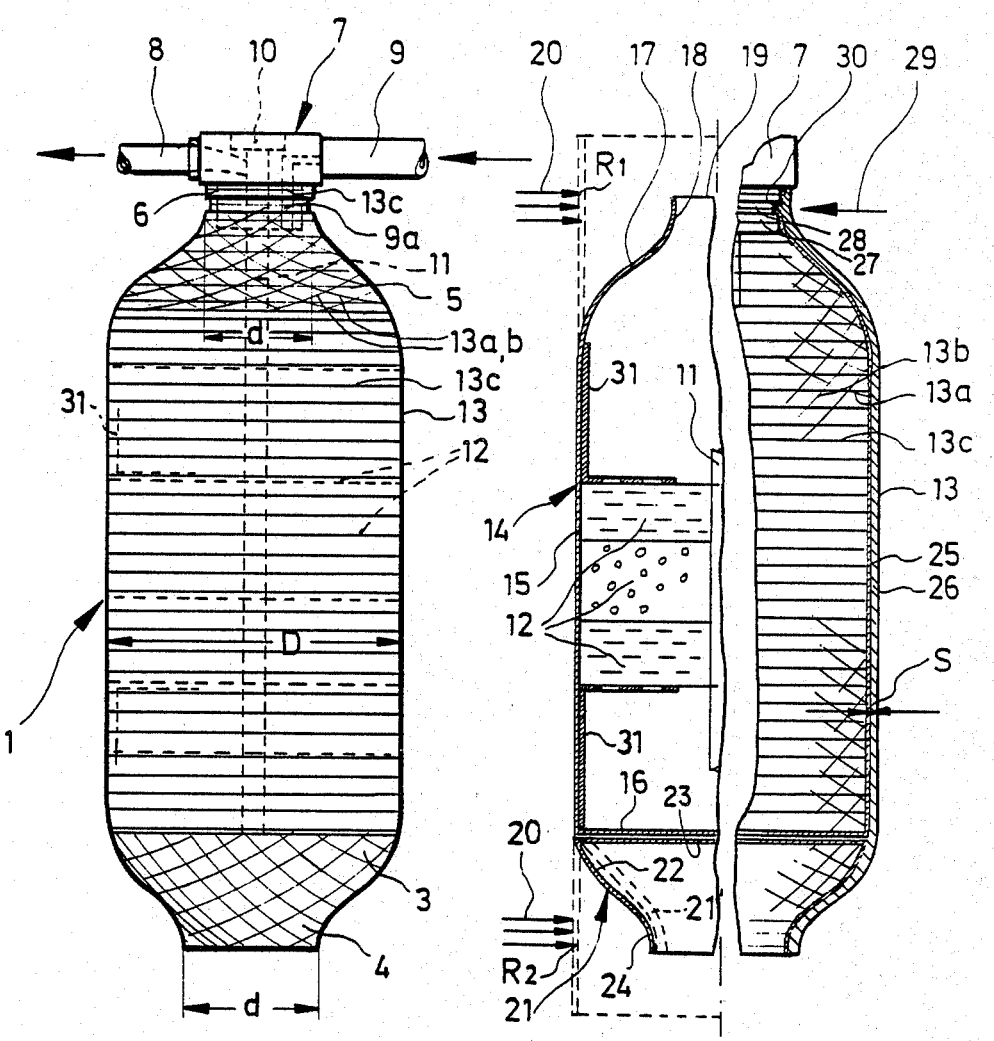
FIG. 1 shows a diagrammatical elevational view of a pressure vessel for use as a drier vessel in a vehicle air conditioning installation.
FIG. 2a shows a sectional view of the lefthand half of the pressure vessel of FIG. 1 in an intermediate stage of its production.
FIG. 2b shows the righthand half of the pressure vessel in the final stage of its production.

A pressure vessel 1, particularly for use as a drier vessel in a vehicle air conditioning installation, has a hollow casing 2 having a cambered bottom portion 3 with a cylindrical spigot 4. The top portion of casing 2 is formed to the shape of a cupola merging into a collar 6. Secured thereto is a connector fitting 7 having opposite ports for the connection of conduits 8 and 9, and a bore 10, indicated by dotted lines, for the connection of an outlet pipe 11, likewise indicated by dotted lines, extending downwards into pressure vessel 1. Supported within vessel 1 by support elements 31 are layers 12 of filtering and drier materials. Conduit 8 communicates with outlet pipe 11. Conduit 9 communicates with the interior of vessel 1 through a passage 9a. Vessel 1 is designed to withstand an interior pressure of more than 100 bar. Spigot 4 and collar 6 each have an outer diameter d substantially corresponding to one-half of the outer diameter D of casing 2.

The internal arrangement and the production of the pressure vessel shown in FIG. 1 will become evident from consideration of FIGS. 2a and 2b.

The production of pressure vessel 1 is initiated by providing a cylindrical standard blank (indicated by dotted lines) as used in the mass production of spray dispensers or beverage containers and usually made by draw-forming an aluminium sheet having a thickness of about 0.45 mm or less. It is of course also possible to employ such blanks made of sheet steel or plastic material with a correspondingly small wall thickness. Blank R1 acts as a core body 14 for the pressure vessel 1 to be made and has a cylindrical wall 15 and a planar lower bottom 16 having a thickness of for instance 1.3 to 2.5 mm. Inserted into core body 14 through the open end thereof are, in sequence, lower support element 31, filtering and drier components 12 (a filter body and a silica gel cartridge), pipe 11 and upper support element 31. These components may also be assembled into a prefabricated unit. Subsequently the open end portion of blank R1 is deformed as by pressing, roll-forming or chasing (as indicated by arrows 20), to result in a domed top portion 17 and a substantially cylindrical spigot extension 18, the latter forming collar 6 in the finished pressure vessel 1 as shown in FIG. 1 and having an opening 19 for insertion of connettor fitting 7.

Secured to the bottom side of bottom wall 16 is an auxiliary winding body 21 which may also be formed of a standard blank R2 from the mass production of spray dispensers or beverage containers and is preferably shorter than blank R1. Standard blank R2 is deformed as by roll-forming, press-forming or chasing as indicated by arrows 20, to result in a domed outer wall 22 or a conical outer wall 21' and a cylindrical bottom extension 24 similar to top extension 18.

Auxiliary winding body 21 may have a planar bottom wall 23 having an outer diameter corresponding to that of bottom wall 16 and being disposed in surface engagement therewith. It would also be feasible, however, to employ an auxiliary winding body 21 having a ribbed bottom wall. A further possibility is to employ bottom walls 16 and/or 23 having an inwards or outwards directed camber. This could, when so desired, already be considered when selesting standard blanks R1 and R2, since standard blanks of this type are also used for certain spray dispensers or beverage containers.

Connector fitting 7 is then inserted into opening 19 of top extension 18, fitting 7 being provided with an insertion plug 27 having a peripheral groove 28 for this purpose. By roll-forming press-forming or chasing a circumferential portion 30 of top extension 18 is deformed into groove 28, preferably with the introduction of an adhesive as indicated by arrow 29, to thereby ensure the hermetically sealed retention of connector fitting 7.

The thus prepared intermediate product is then mounted in a winding apparatus by the employ of connector fitting 7 and bottom extension 24 as the mounting points. Subsequently a winding layer 13 composed for instance of glas fibre strands 25 and an adhesive resin 26 such as polyester is applied to the outer surface by a conventional winding method. Winding layer 13 extends from the upper edge of top extension 18 at least to the root of bottom extention 24 or preferably even to its free end. Finally bore 10 at the free end of connector fitting 7 may be closed by filling it with a castable material. The fibers employed for winding layer 13 may be glass fibers, carbon fibers, steel fibers or fibers of any other high-strength material.

As diagrammatically indicated in FIGS. 1 and 2b, the fiber stands of winding layer 13 are initially wound along intersecting helical paths as indicated by lines 13a, 13b. In the final stage fibre strands 25 are wound in the form of circumferential bandages at least on the cylindrical portions as indicated by lines 13c. The thickness of winding layer 13 is greater than the thickness S of core body 14 to thereby ensure sufficient resistance to pressure.

The outer surface of the winding layer may be provided with a surface coating or an addition protective casing. It would also be feasible to provide top extension 18 with interior threads for engagement with exterior threads formed on connector fitting 7. The auxiliary winding body 21 may also be formed of a light-weight cage, particularly if bottom wall 16 is of sufficient thickness to resist high pressures or has its strength increased by being cambered. The insertion plug 27 of connector fitting 7 might also be adhesively secured to the free edge of top extension 18.

Figure 3:
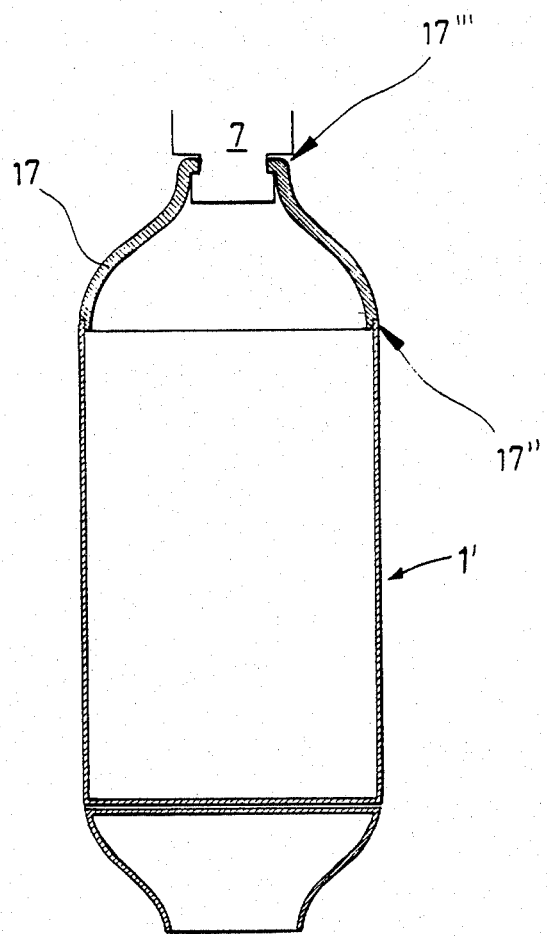
FIG. 3 shows a sectional view of another embodiment of the pressure vessel in an intermediate stage of its production.

Instead of shaping domed top portion 17 of pressure vessel 1 in one piece with the cylindrical portion of core body 14, it is also possible to employ a separate dome-shaped top portion 17' as shown in FIG. 3. In this case, the wall thickness of top portion 17' may be greater than that of the cylindrical portion, for instance 1.5 to 2.5 mm. Top portion 17' is adhesively secured to the cylindrical portion and to connector fitting 7 as indicated at 17" and 17''', respectively. This modification permits the operation of deforming standard blank R1 to be omitted.

It is finally possible to employ a core body in the form of a thin-walled pipe connected at its ends to dome-shaped end portions similar to top portion 17'.

In another embodiment of pressure vessel 1" shown in FIGS. 4 and 4a, insertion plug 27' of connector fitting 7 is inserted into extension 18 of top portion 17. Pipe 11 projects into the interior of pressure vessel 1". Top extension 18 of core body 14 is surrounded by a strengthening sleeve 32 formed of a material similar to that of the core body, i.e. aluminum sheet, steel sheet or plastic. The upper edge 34 of strengthening sleeve 32 extends approximately coplanar with the upper edge of top extension 18. Its lower edge 33 extends substantially to the root of extension 18 at its connection to dome-shaped top portion 17. On deformation of top extension 18, as indicated by arrow 29, strengthening sleeve 32 is also deformed in unison therewith to be thereby lockingly engaged with circumferential groove 28. Sleeve 32 is in surface engagement with top extension 18 over its full length, resulting in a strengthening of top portion 17 in the vicinity of top extension 18 and its root portion 35 to increase its resistance to internal pressure. Winding layer 13 may extend over at least part of the axial length of strengthening sleeve 32. The deformed edge portion 34 of strengthening sleeve 32 is indicated at 34'.

The upper end of insertion plug 27' of connector fitting 7 is provided with a screw or plug coupling portion 36 comprising a threaded bore 37 for receiving a threaded plug 38 resting on a shoulder of threaded bore 37 with the interposition of a seal member 39. Threaded plug 38 acts to retain outlet pipe 11 within pressure vessel 1". At the same time it acts as a limit stop for a member to be threaded into threaded bore 37.

Shown in FIG. 4a is a first embodiment of the bottom portion of pressure vessel 1". In this embodiment bottom wall 16" of standard blank R1 is formed with an outwards directed camber as indicated by arrows 40. The camber is advantageously formed by the insertion of a simple tool prior to the deformation of the top portion of standard blank R1. The camber of bottom wall 16" results in a spherical outer surface of core body 14 which is particularly well suited for applying winding layer 13 thereto.

In this case the auxiliary winding body 21" secured to the outer surface of cambered bottom wall 16" is not formed of a standard blank, but is rather an annular bddy 42 preferably formed with a rounded transition merging into outer surface 41. Auxiliary winding body 21" may be adhesively secured to bottom wall 16" or welded thereto when the two parts are metal. For the purpose of weight reduction auxiliary winding body 21" is formed with a bore 44 which may be closed by a bottom 43 when body 21" is used for stiffening bottom wall 16'.

In this embodiment auxiliary winding body 21" is provided with a coupling element 45 for cooperating with coupling portion 36 on top portion 17. Coupling element 45 comprises an extension 46 formed with exterior threads 47 for engagement with the interior threads of threaded bore 37. The production of pressure vessel 1" is initiated by cambering bottom wall 16' prior to the insertion of the components described with reference to FIGS. 1 and 2 into core body 14. After subsequently shaping vessel top portion 17, insertion plug 27' of connector fitting 7 is inserted and secured by deforming top extension 18 in unison with strengtheing sleeve 32. After auxiliary winding body 21" has been subsequently secured to bottom wall 16', the thus prepared intermediate product is coaxially connected to other intermediate products provided with the same coupling portions 36 and coupling elements 45 to result in a winding unit E which may then be mounted in a winding machine as shown in FIG. 5 to have the winding layer 13 applied thereto in a single operation. The coupling components 36, 45, 45', 50 could also be suitably designed to cooperate with one another in the manner of a bayonet coupling or a quick release coupling.

FIG. 4b shows another embodiment of the bottom portion of a pressure vessel 1''' which is likewise useful for interconnecting a plurality of such vessels for the purpose of applying the winding layer thereto in a single operation. In this embodiment bottom wall 16" of core body 14 has an outwards directed camber and is formed with a bottom spigot extension 18' having an opening 48 for the insertion of the insertion plug 27" of a further connector fitting 7', so that pressure vessel 1''' has a top inlet and a bottom inlet. Insertion plug 27" is again secured by deforming bottom extension 18' into a circumferential groove 28 with the interposition of an adhesive. An axial bore 49 extending through insertion plug 27" merges through a shoulder with an outwards opening threaded bore 50 for receiving either coupling element 45 of the embodiment shown in FIG. 4a or another coupling element 45' formed as a threaded bushing 51 having exterior threads 52 and a exagonal bore 53. Coupling element 45' is only required for connecting a plurality of the intermediate products to one another to the purpose of applying the winding layer thereto, and is no longer required on the finished pressure vessel 1'''.

As shown in FIG. 5, a winding unit E formed of a plurality of interconnected intermediate products for making pressure vessels 1" is mounted in a winding machine 54 having a bed frame 55 with a pair of supports 56 and 57 carrying a spindle 58 and a chuck 59, respectively. Winding unit E is mounted in winding machine 54 for rotation for instance in the direction of arrow 60, to which purpose chuck 59 is operatively connected to a motor 65. Bed frame 55 additionally carries a support 61 mounted thereon for displacement in the directions of double arrow 64 and carrying a winding element 62 and a supply spool for a supply of fibre strands 25. The machine is also provided with means for the supply of an adhesive or resin for impregnating and wetting the fibre strands. The core bodies 14 are fixedly connected to one another by coupling portions 36 and coupling elements 45, so that they are prevented from being rotated relative to one another by the forces acting thereon during the winding operation.

The winding layer is applied to winding unit E by rotating the latter and simultaneously displacing winding element 62 in the longitudinal direction. Prior to or after curing of the winding layer the finished winding unit E is removed from Winding machine 54. The finished pressure vessels are separated from one another by releasing the connections therebetween, to which purpose portions of the winding layer may be removed at the separation locations by conventional means.

I claim:

1. A pressure vessel particularly for drying the refrigerant in a vehicle air conditioning installation, comprising an elongate hollow casing (2) including a bottom wall and a dome-shaped top portion (17) formed with a spigot extension (18) and consisting of an interior core body (14) having at least one open end and a winding layer (13) of fibre-reinforced plastics material bonded to the outer surface thereof, characterized in that said core body (14) is a cylindrical standard blank (R1) from the mass-production of spray dispensers or beverage containers having one open end deformed as by press-forming roll-forming or chasing to the shape of said top portion (17) including said spigot extension (18).

2. A pressure vessel, particularly for drying the refrigerant in a vehicle air conditioning installation, comprising an elongate hollow casing (2) having a bottom wall and a dome-shaped top portion formed with a spigot extension and consisting of an interior core body (14) and a winding layer (13) of fibre-reinforced plastic material bonded to its outer surface, characterized in that both ends of said core body (14) are provided with coupling elements (36,45) in coaxial alignment with the longitudinal axis of the pressure vessel for interconnecting at least two core bodies (14)—bottom end to bottom end or bottom end to top end—in coaxial alignment to thereby form a winding unit (E).

3. A pressure vessel according to claim 2, characterized in that a plug-shaped insertion member (27') of a connector fitting (7) is secured in said spigot extension (18), said insertion member (27') including said coupling element (36) in the form of a screw- or plug-coupling portion (37), a complementary coupling element (45) or counter-coupling element (46) being provided on said auxiliary winding body (42) for cooperation with said coupling portion (37).

4. A pressure vessel according to claim 3, characterized in that said screw- or plug-coupling portion (37) comprises a threaded bore and that said coupling element (46) comprises a screw coupling member having exterior threads (47).

5. A pressure vessel according to claim 4, characterized in that said coupling portion (37) comprises a threaded bore for securing a connector fitting element (11) extending into the interior of the pressure vessel, and that the connector fitting element (11) screwed into said threaded bore defines a stop (38) for limiting the insertion depth of the threaded coupling element of a further similar pressure vessel.

6. A pressure vessel according to claim 1, wherein an auxiliary winding body (42, 21, 21') is applied at least to the closed end of said core body (14) opposite said top portion and said spigot extension, said auxiliary winding body being included in said winding layer (13), characterized in that said auxiliary winding body (45,21,21') has a preferably stiffened bottom wall (23) in surface engagement with the outer surface of the bottom wall (16) of said core body (14).

7. A pressure vessel according to claim 6, characterized in that said bottom walls (16, 23) are of substantially planar shape.

8. A pressure vessel according to claim 6, characterized in that said auxiliary winding body (21, 21') is a cylindrical standard blank from the mass-production of spray dispensers or beverage containers having its open end deformed as by press-forming roll-forming or chasing to a dome-shaped or conical configuration.

9. A pressure vessel according to claim 8, characterized in that said auxiliary winding body (21, 21') is formed of a standard blank (R2) similar to the standard blank (R1) of said core body (14), but of shorter length.

10. A pressure vessel according to claim 6, characterized in that said bottom wall (16') of said core body (14) is formed with an outwards directed camber and that an auxiliary winding body (21, 21', 45) of a shape and diameter substantially similar to that of said spigot extension (18) of said core body (14) is secured to said cambered bottom wall (16') as by bonding or welding.

11. A pressure vessel according to claim 1, characterized in that said bottom wall (16") of said core body (14) is formed with an outwards directed camber and an opening therethrough, and provided with a preferably integrally formed spigot extension (18') projecting therefrom in opposition to said spigot extension (18) on said top portion (17).

12. A pressure vessel according to claim 11, characterized in that an insertion member (27') of a connector fitting (7, 7') is secured in each of said spigot extension (18) on said top portion (17) and said spigot extension (18') on said bottom wall (16") of said core body (14), both said insertion members (27, 27') being formed with outwards opening threaded bores (37, 50), a pair of similar pressure vessels ("'1'") being adapted to be coaxially connected to one another by a removable threaded coupling member (45') received in both said threaded bores (50, 37).

13. A pressure vessel according to claim 1, characterized in that said core body (14) is a standard blank made of aluminum sheet, steel sheet or plastic.

14. A pressure vessel according to claim 13, characterized in that the wall thickness (s) of the cylindrical portion of said core body (14) is approximately 0.45 mm.

15. A pressure vessel according to claim 1 and/or 2, characterized in that a connector fitting (7) having a plug-shaped insertion portion (27) is secured in said spigot extension (18), said insertion portion (27) having at least one circumferential groove (28), a circumferential portion (30) of said spigot extension (18) being deformed into engagement with said circumferential groove (28) as by roll-forming, press-forming or chasing, a bonding agent, preferably an adhesive being interposed between said insertion portion (27) and said spigot extension (18).

16. A pressure vessel according to claim 15, characterized in that at least said spigot extension (18) on said top portion (17) of said core body (14) is surrounded by a strengthening sleeve (32) extending to the root portion (36) of said spigot extension (18) merging into said dome-shaped top portion of said core body and preferably deformed in unison with said spigot extension (18) as by roll-forming, press-forming or chasing.

* * * * *